J. W. KIME.
COUPLING.
APPLICATION FILED JULY 23, 1912.
1,066,735.
Patented July 8, 1913.
2 SHEETS—SHEET 1.
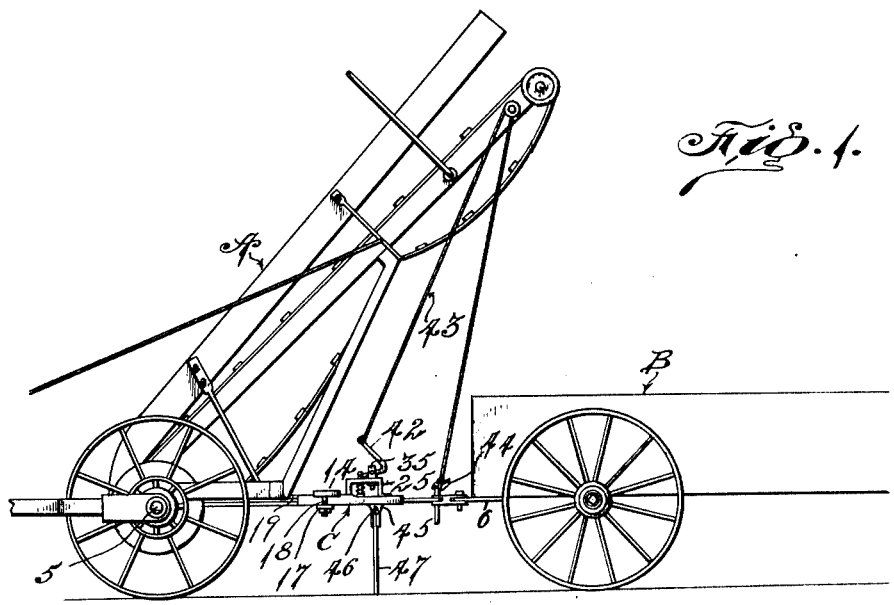
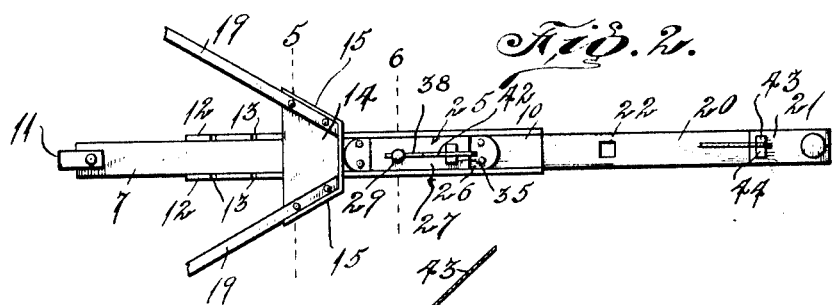
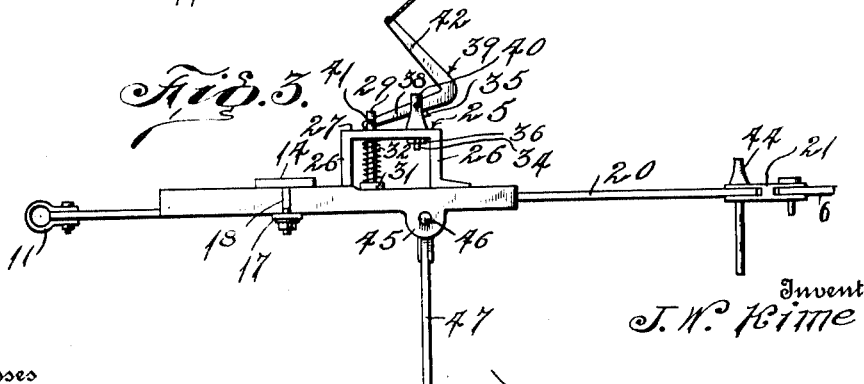
Inventor
J. W. Kime

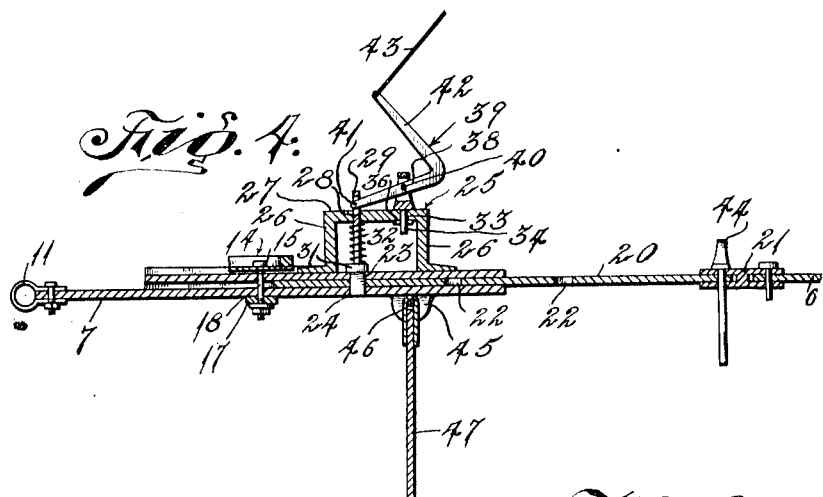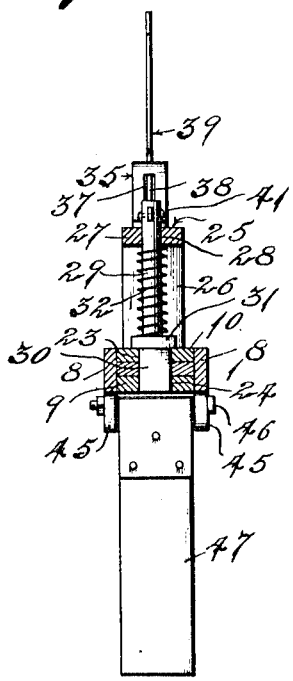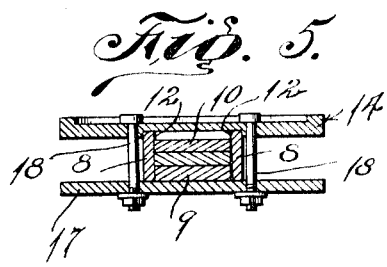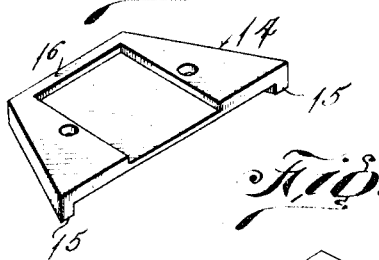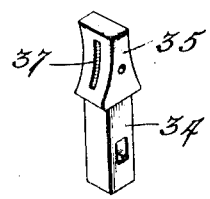

UNITED STATES PATENT OFFICE.

JAMES W. KIME, OF FOSTORIA, OHIO.

COUPLING.

1,066,735. Specification of Letters Patent. Patented July 8, 1913.

Application filed July 23, 1912. Serial No. 711,140.

*To all whom it may concern:*

Be it known that I, JAMES W. KIME, a citizen of the United States, residing at Fostoria, in the county of Seneca, State of Ohio, have invented certain new and useful Improvements in Couplings; and I do hereby declare the following to be a full, clear, and exact description of the invention, such as will enable others skilled in the art to which it appertains to make and use the same.

This invention relates to improvements in couplings of that type which are especially adapted for use for connecting a hay loader and wagon together.

The principal object of the invention is to provide a coupling of the character described by means of which the relative positions between the hay loader and wagon may be easily adjusted by the operator on the load for permitting the loader to discharge hay therefrom in a uniform manner from the front to the rear end of the wagon.

Another object of the invention is to provide a coupling of the character described which can be readily attached to or detached from any hay loader now in general use.

A further object of the invention is to provide a coupling having a bracket adjustably mounted thereon for engagement with the various lateral tongue braces of the various hay loaders.

A still further object of the invention is to provide a coupling which may be readily disengaged from the wagon by the operator while upon the load, thereby permitting the loaded wagon to be transported.

A still further object of the invention is to provide a coupling for the purpose set forth, which is composed of a minimum number of parts, is therefore simple in construction, and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a side elevation, partly in section, showing the application of a coupling constructed in accordance with my invention, Fig. 2 is an enlarged detail top plan view thereof, Fig. 3 is a side elevation of the coupling, Fig. 4 is a longitudinal sectional view therethrough, Fig. 5 is a cross sectional view taken on the line 5—5 of Fig. 2, Fig. 6 is a cross sectional view taken on the line 6—6 of Fig. 2, Fig. 7 is an inverted perspective view of the brace clip, and Fig. 8 is a perspective view of the lever supporting post.

Like reference numerals designate corresponding parts in all the figures of the drawings.

Referring to the drawings, A designates a wheeled hay loader including the usual axle 5, and B indicates a wheeled wagon of the ordinary construction including the usual reach bar 6.

My invention comprises a coupling, which is indicated as a whole by the reference letter C, and this coupling is adapted for connecting the hay loader A and wagon B together to permit of the hay from the loader being uniformly distributed upon the wagon. This coupling includes a hollow open ended main tongue 7 which consists of spaced side walls 8—8, a bottom 9 and a top 10. The rear end of the bottom 9 extends beyond the side walls 8 and is connected to the axle 5 of the hay loader A by means of a bearing 11 of any suitable construction. The rear portions of the side walls 8 extend above the top 10 to form longitudinal flanges 12—12, and these flanges are formed with spaced alined sets of notches 13—13. A brace clip 14 is positioned upon the flanges 12, and the ends thereof project beyond the side walls 8 of the tongue and are formed with inclined upstanding end flanges 15—15. The underface of the clip 14 is centrally recessed to receive the flanges 12, and to form a resultant depending longitudinal flange 16 which is adapted to engage in any pair of notches 13, thereby interlocking said clip with the tongue. In order to hold said clip against accidental displacement, there is provided a cross bar 17 which is disposed against the bottom 9 of the tongue, and this bar is connected to the clip by means of bolts 18—18. Lateral braces 19—19 extend forwardly from the loader A and have their front ends disposed upon the clip 14 and against the respective end flanges 15. The forward ends of these braces are secured to said clip by means of bolts. This clip by being adjustably connected along the tongue 7 is capable of being readily attached to any length braces 19 of different loaders.

Slidably mounted within the main tongue 7 is an extension tongue 20 which is connected at its forward end to the rear end of the reach bar 6 of the wagon B by means of a clevis 21 or other suitable connection. The rear end of the extension tongue 20 is formed with a plurality of spaced angular openings 22 which are adapted to successively register with alined openings 23 and 24 that are respectively formed in the bottom and top 9 and 10 of the main tongue 7, said openings 23 and 24 being disposed in advance of the flanges 12. An inverted U-shaped bracket 25 is attached to the top 10 of the main tongue 7 and has its legs 26—26 respectively disposed in advance of and in rear of the opening 24. Formed in the connecting portion 27 of this bracket and in alinement with the openings 23 and 24 is an opening 28 in which is slidably mounted a stem 29 of a rectangular pin 30, said pin being adapted to project through the openings 24, 23 and in any one of the openings 22 and thereby lock the extension tongue 20 against relative longitudinal movement with respect to the main tongue 7. The upper end of the pin 30 is enlarged to form a stop shoulder 31 for engagement with the top wall 10 and thereby limit the downward movement of said pin. Disposed around the stem 29 between the connecting portion 27 of the bracket 25 and the shoulder 31 is a coil spring 32 which tends to yieldably hold the pin 30 in its gravitated or operative position. Also formed in the connecting portion 27 of the bracket 25 and disposed in advance of the opening 28 is a similar opening 33 which receives the reduced stem 34 of a post 35. A cross pin 36 extends through the stem 34 and serves to lock the post against accidental displacement. The post is centrally formed with a longitudinal slot 37 for receiving a horizontal arm 38 of a bell crank lever 39. This arm is fulcrumed intermediate its ends to the post by means of a pin 40, and has its free end pivotally connected to the upper end of the stem 29 by means of a pin 41. The other arm 42 of the bell crank lever normally extends rearwardly, and is connected at its free end with one end of an operating cord 43. This cord extends to the upper portion of the loader A and is then trained around a suitable roller or other support, and has its other end connected to the clevis pin 44. By means of this cord either the locking pin 30 may be elevated or the clevis pin 44 disengaged.

Depending from the forward portion of the main tongue 7 is a spaced pair of ears 45—45, and pivotally connected to these ears by means of a bolt 46 is the upper end of a swinging tongue support 47, the purpose thereof being to support the tongue while the loader A is not being used.

In operation, the hay loader A is connected as close as possible to the wagon B, so that the upper end of the loader is disposed above the front portion of the wagon body. In this position the extension tongue 20 is disposed as far as possible within the main tongue 7. As soon as the front portion of the wagon body becomes filled with hay, the operator, who is upon the load, pulls upon the cord 43 to elevate the locking pin 30. The wagon is then shifted forwardly and immediately upon movement of the wagon the operator releases the cord 43 whereupon the spring 32 will immediately cause the pin 30 to pass through the next opening 22 of the extension tongue 20, and thereby lock said extension tongue against movement. By this means, the distance between the loader A and wagon B can be adjusted by a step by step movement, and as a result, the hay from the loader will be uniformly distributed upon the wagon body from the front to the rear end thereof, and without the necessity of the operator leaving the load. When the wagon has been loaded, the operator then pulls upon the other end of the cord 43 and releases the clevis pin 44, thereby disconnecting the wagon from the loader without the necessity of getting down from the load.

What is claimed is:

1. The combination with a wagon including its running gear, of a hay loader including an axle and having a discharge end normally arranged above the front end of the wagon, a main tongue connected to the axle of the loader, an extension tongue, a pin connecting the extension tongue and the running gear of the wagon, a spring actuated pin carried by the main tongue for engagement with the extension tongue, and a flexible connection between the coupling pin and the spring actuated pin for alternately releasing said pins upon movement of the connection by the operator on the wagon.

2. In a coupling of the character described, the combination with a hollow main tongue having an opening formed therein, of an extension tongue slidably mounted therein and formed with a series of spaced openings arranged in longitudinal alinement, a bracket carried by the main tongue and formed with an opening which registers with the opening of said main tongue, a pin projecting through the opening of the tongue and into one of the openings of the extension tongue, said pin having a stem projecting into the opening of the bracket, a coil spring disposed around the stem and bearing against the bracket for yieldably holding said pin in engagement with the extension tongue, and an operating lever fulcrumed on the bracket and having pivotal connection with the stem for releasing the pin from the extension tongue.

3. In a coupling of the character described, the combination with a hollow main tongue having an opening formed therein, of an extension tongue slidably mounted therein and formed with a series of spaced openings arranged in longitudinal alinement, an inverted U-shaped bracket carried by the main tongue, said bracket including spaced legs arranged on opposite sides of the opening of the main tongue and a connecting portion having an opening formed therein, a pin disposed within the opening of the main tongue for engagement in one of the openings of the extension tongue and having its upper end reduced to form a stem arranged within the opening of the bracket, a collar arranged intermediate the pin and stem, a coil spring disposed around the stem intermediate the collar and the bracket for yieldingly holding the pin in engagement with the extension tongue, and an operating lever fulcrumed on the bracket and engageable with the stem to elevate the pin against the tension of the spring.

4. In a coupling of the character described, the combination with a hollow main tongue, of an extension tongue slidably mounted therein, a bracket carried by the main tongue, said tongues and bracket being respectively formed with alined openings, a locking pin slidably mounted in said openings of the tongues and having a stem slidably mounted in the opening of the bracket, said pin being formed with a collar, a coil spring disposed around the stem intermediate the collar and bracket for yieldably holding the pin in engagement with the extension tongue, and an operating lever fulcrumed on the bracket and engageable with the stem to elevate the pin against the tension of the spring.

5. In a coupling of the character described, the combination with a hollow main tongue, of an extension tongue slidably mounted therein, a bracket carried by the main tongue, said tongues and bracket being respectively formed with alined openings, a locking pin slidably mounted in said openings of the tongues and having a stem slidably mounted in the opening of the bracket, said pin being formed with a collar, a coil spring disposed around the stem intermediate the collar and bracket for yieldably holding the pin in engagement with the extension tongue, a post carried by the bracket, a bell crank lever including a normally vertical and a normally horizontal arm, the last mentioned arm being centrally fulcrumed on the post and having pivotal connection at its end with the stem and adapted upon movement of the vertical arm in one direction to elevate said stem against the tension of said spring.

6. In a coupling of the character described, the combination with a main tongue adapted for engagement with the axle of a hay loader, said tongue being formed with spaced longitudinal upstanding ribs respectively formed with opposed sets of spaced notches, of a brace clip adapted for interlocking engagement with any pair of notches, means for clamping the clip to the tongue, an extension tongue adjustably connected to the main tongue, and means carried by said extension tongue for engagement with the running gear of the wagon.

In testimony whereof, I affix my signature, in presence of two witnesses.

JAMES W. KIME.

Witnesses:
JOHN R. BRADNER,
U. C. McDOLE.